(12) United States Patent
Bugenhagen

(10) Patent No.: US 10,491,500 B2
(45) Date of Patent: *Nov. 26, 2019

(54) SYSTEM AND METHOD FOR PATH STATE DETERMINATIONS

(71) Applicant: CenturyLink Intellectual Property LLC, Denver, CO (US)

(72) Inventor: Michael K. Bugenhagen, Overland Park, KS (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,161

(22) Filed: Mar. 16, 2015

(65) Prior Publication Data

US 2015/0188796 A1    Jul. 2, 2015

Related U.S. Application Data

(63) Continuation of application No. 14/253,759, filed on Apr. 15, 2014, now Pat. No. 9,007,891, which is a continuation of application No. 12/482,957, filed on Jun. 11, 2009, now Pat. No. 8,699,321.

(60) Provisional application No. 61/155,610, filed on Feb. 26, 2009, provisional application No. 61/119,765, filed on Dec. 4, 2008.

(51) Int. Cl.
*H04L 12/26* (2006.01)
*H04L 12/24* (2006.01)
*H04L 12/911* (2013.01)
*H04L 12/803* (2013.01)

(52) U.S. Cl.
CPC ........ *H04L 43/0882* (2013.01); *H04L 41/147* (2013.01); *H04L 41/22* (2013.01); *H04L 41/5025* (2013.01); *H04L 43/062* (2013.01); *H04L 43/0811* (2013.01); *H04L 43/0888* (2013.01); *H04L 43/14* (2013.01); *H04L 43/16* (2013.01); *H04L 47/122* (2013.01); *H04L 47/746* (2013.01); *H04L 41/06* (2013.01); *H04L 43/0852* (2013.01)

(58) Field of Classification Search
None
See application file for complete search history.

(56) References Cited

U.S. PATENT DOCUMENTS

| | | | |
|---|---|---|---|
| 6,901,051 B1 * | 5/2005 | Hou | H04L 43/02 370/231 |
| 6,934,251 B2 | 8/2005 | Ono | |
| 7,035,220 B1 | 4/2006 | Simcoe | |

(Continued)

OTHER PUBLICATIONS

U.S. Appl. No. 12/421,525; NonFinal Office Action dated Nov. 26, 2010; 8 pages.

(Continued)

*Primary Examiner* — Adnan Baig

(57) ABSTRACT

A system and method for determining a state of a communications system. A determination is made whether a communications path is fully functional, impaired, or non functional. A maximum capacity available to the communications path is determined in response to determining the communications path is impaired. The communications path is limited to a maximum capacity available in response to determining the maximum capacity of the connection as impaired.

20 Claims, 6 Drawing Sheets

(56) References Cited

U.S. PATENT DOCUMENTS

| | | | |
|---|---|---|---|
| 7,042,841 B2 | 5/2006 | Abdelilah et al. | |
| 7,551,560 B1 | 6/2009 | Duong-Van et al. | |
| 7,587,203 B2 | 9/2009 | Shahidi et al. | |
| 8,068,425 B2 | 11/2011 | Bugenhagen | |
| 8,699,321 B2 | 4/2014 | Bugenhagen | |
| 8,879,391 B2 | 11/2014 | Bugenhagen | |
| 9,007,891 B2 | 4/2015 | Bugenhagen | |
| 2002/0042275 A1 | 4/2002 | Kitazawa et al. | |
| 2002/0174216 A1 | 11/2002 | Shorey et al. | |
| 2005/0064870 A1* | 3/2005 | Gabara | H04W 64/00 455/438 |
| 2006/0018664 A1 | 1/2006 | Levinson et al. | |
| 2006/0109786 A1* | 5/2006 | Abdel-Kader | H04L 29/06027 370/232 |
| 2006/0146784 A1* | 7/2006 | Karpov | H04L 12/2856 370/351 |
| 2006/0217116 A1* | 9/2006 | Cassett | H04L 41/5009 455/423 |
| 2007/0091796 A1 | 4/2007 | Filsfils et al. | |
| 2007/0242770 A1 | 10/2007 | Kim et al. | |
| 2008/0002585 A1* | 1/2008 | Safranek | H04J 3/1682 370/235 |
| 2008/0107036 A1 | 5/2008 | Toyozumi et al. | |
| 2008/0279103 A1* | 11/2008 | Yong | H04L 45/00 370/235 |
| 2010/0027418 A1* | 2/2010 | Rodrig | H04L 41/147 370/235 |
| 2010/0039937 A1 | 2/2010 | Ramanujan et al. | |
| 2010/0056170 A1 | 3/2010 | Lindoff et al. | |
| 2011/0149730 A1* | 6/2011 | Nemeth | H04L 43/0864 370/234 |
| 2014/0226458 A1 | 8/2014 | Bugenhagen | |

OTHER PUBLICATIONS

U.S. Appl. No. 12/421,525; Final Office Action dated May 12, 2011; 8 pages.

U.S. Appl. No. 12/421,525; Notice of Allowance dated Jul. 28, 2011; 7 pages.

U.S. Appl. No. 12/482,957; NonFinal Office Action dated Dec. 15, 2010; 27 pages.

U.S. Appl. No. 12/482,957; Final Office Action dated May 25, 2011; 33 pages.

U.S. Appl. No. 12/482,957; NonFinal Office Action dated Sep. 1, 2011; 33 pages.

U.S. Appl. No. 12/482,957; Final Office Action dated Feb. 13, 2012; 38 pages.

U.S. Appl. No. 12/482,957; NonFinal Office Action dated May 17, 2012; 42 pages.

U.S. Appl. No. 12/482,957; Final Office Action dated Sep. 25, 2012; 50 pages.

U.S. Appl. No. 12/482,957; NonFinal Office Action dated Apr. 11, 2013; 45 pages.

U.S. Appl. No. 12/482,957; Notice of Allowance dated Nov. 26, 2013; 16 pages.

U.S. Appl. No. 13/249,550; NonFinal Office Action dated Jan. 7, 2013; 18 pages.

U.S. Appl. No. 13/249,550; Final Office Action dated May 22, 2013; 17 pages.

U.S. Appl. No. 13/249,550; Advisory Action dated Jun. 17, 2013; 3 pages.

U.S. Appl. No. 13/249,550; Notice of Allowance dated Jun. 17, 2014; 7 pages.

U.S. Appl. No. 14/253,759; NonFinal Office Action dated Oct. 23, 2014; 5 pages.

U.S. Appl. No. 14/253,759; Notice of Allowance dated Dec. 22, 2014; 20 pages.

* cited by examiner

SYSTEM AND METHOD FOR PATH STATE DETERMINATIONS

CROSS-REFERENCES TO RELATED APPLICATIONS

This application is a continuation of U.S. patent application Ser. No. 14/253,759, filed Apr. 15, 2014 by Michael Bugenhagen and titled "System and Method for Path State Determinations", which is a continuation of U.S. patent application Ser. No. 12/482,957, filed Jun. 11, 2009 by Bugenhagen and titled, "System and Method for Path State Determinations", which is a non-provisional of U.S. Provisional Application No. 61/155,610, filed Feb. 26, 2009 by Bugenhagen and titled, "System and Method for Path State Determinations," and U.S. Provisional Application No. 61/119,765, filed Dec. 4, 2008 by Bugenhagen and titled, "Throughput Measures," both of which are hereby incorporated by reference in its entirety.

BACKGROUND

The use and development of communications has grown nearly exponentially in recent years. The growth is fueled by larger networks with more reliable protocols and better communications hardware available to service providers and consumers. In many cases, users, systems, equipment, devices, and other telecommunications elements make service and control decisions based on the state of the system. In many cases, the state information provides insufficient detail to determine the true functionality and capabilities of the system. For example, many systems may only indicate functional or non-functional.

BRIEF SUMMARY

One embodiment provides a system and method for determining a state of a communications system. A determination may be made whether a communications path is fully functional, impaired, or non functional. A maximum capacity available to the communications path may be determined in response to determining the communications path is impaired. The communications path may be limited to a maximum capacity available in response to determining the maximum capacity of the connection as impaired.

Another embodiment provides a communications system for adjusting bandwidth in an impaired state. The system may include a communications connection connected to a communications device. The communications connection may be operable to communicate data packets to one or more parties. The system may further include the communications device operable to communicate packets to one or more parties through the communications connection, determine whether the communications connection is in a fully functional state, an impaired state, or a non-functional state, determine a maximum capacity available to the communications connection in response to determining the communications connection is in the impaired state, and limit the communications connection to the maximum capacity available.

Another embodiment provides a communications device. The communications device may include a network interface for communicating packets through a communications path. The communications device may further include state logic in communication with the network interface. The state logic may be operable to determine performance information for the communications path, determine whether a communications path is fully functional, impaired, or non functional, determine a maximum capacity available to the communications path in response to determining the communications path is impaired, and limit the communications path to the maximum capacity available in response to determining the maximum capacity of the connection.

BRIEF DESCRIPTION OF THE DRAWINGS

Illustrative embodiments of the present invention are described m detail below with reference to the attached drawing figures, which are incorporated by reference herein and wherein.

DETAILED DESCRIPTION OF THE DRAWINGS

Figure 1:
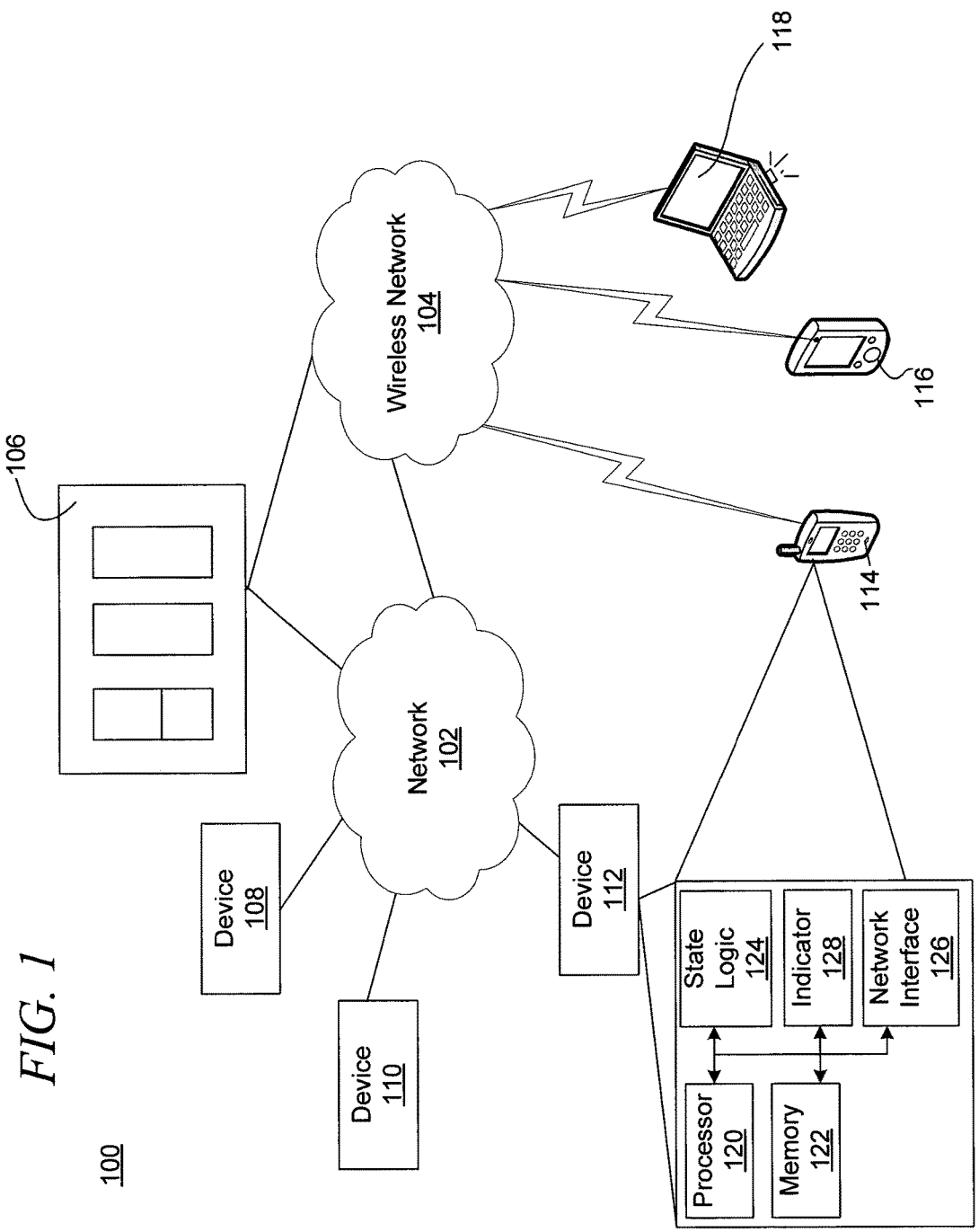
FIG. 1 is a pictorial representation of a communications environment in accordance with an illustrative embodiment.

The illustrative embodiments provide a system and method for determining path state information for a communications path. State information or path information is information and data about communication systems, paths, connections, and devices. For purposes of simplicity, the state information may be referred to in the context of systems even though any number of stand-alone devices or integrated elements may utilize the state information. For example, any number of customer premise equipment devices, network elements, and other communications devices that have a wireless or wired network connection may implement the illustrative embodiments. The state information may rely on or include performance information. Performance information is the characteristics and performance information for a communications path.

The state information may be utilized to manage and control one or more communications systems, reconfigure services, and provide feedback for making decisions. In one embodiment, the state information may provide control inputs for communications layers two and above of the OSI model and session controller models. In one embodiment, the state information may include states specifying whether the path is functional, impaired, or non-functional. However, in other embodiments, any number of states or categories may be utilized. The utilization of an impaired path in accordance with an illustrative embodiment, may allow communications systems, equipment, devices, and administrators to operate in a state or conditions that may have previously been categorized as non-functional. Impaired paths may be utilized as an alternative to the existing "all or nothing" functionality of many systems and devices and may allow communications service providers to be more adaptive to problems and situations that occur regularly.

The path utilization and or available bandwidth state information may further include a moving average, a directional trend, and historical information for goodput. Goodput is the application level throughput in a communications path. In another embodiment, the goodput may also be defined as the delivered throughput or the delivered throughput after accounting for any frame loss. For example, the goodput may be a number of useful bits per unit of time forwarded by the network from a source address to a destination. The goodput may exclude protocol overhead retransmitted data packets. For example, if a file is transferred, the goodput that the user experiences may correspond to the file size in bits divided by the file transfer time. The throughput is the gross bit rate that is transferred physically. The network access connection speed is the channel capacity or bandwidth. The goodput is generally lower than the throughput and the throughput is generally lower than network access connection speed. The state information may be determined outside of existing outputs of the application layer. For example, the average goodput as determined over a two hour period may be utilized to communicate the maximum bandwidth through a communications path in an impaired state.

The illustrative embodiments may provide state information to both communications service providers and customers. The state information may be utilized by a system, device, or application to control and protect traffic. In particular, the state information may be utilized by layers of the open system interconnect (OSI) model, such as the application layer. The state information may also provide details to the customer regarding the past and ongoing status of the systems in order to reconfigure systems, devices, and processes as needed. For example, the state information may provide information regarding trunks that may specify when there is congestion and whether the trunks are impaired or unavailable. In another embodiment, the state information may be presented as one or more indicators to a user in order to maximize device and connection performance and allow system feedback to the user for decision making purposes FIG. 1 is a pictorial representation of a communications environment 100 in accordance with an illustrative embodiment. The communications environment 100 of FIG. 1 may include various elements that may be used for wireless and wired communication. The communications environment 100 may include a network 102, a wireless network 104, a communications management system 106, devices 108, 110, and 112, and wireless devices 114, 116, and 118. The wireless devices 114, 116, and 118 may be interconnected by any number of paths. In other embodiments, the communications environment 100 or devices 108, 110, and 112 may include any number of operators, measurement points, maintenance entities, maintenance end points (MEP), service network interfaces (SNI), network interface devices, Ethernet to External Network to Network Interface (E-NNI), servers, user networks, exchanges, interfaces, customer devices, bearer paths, services, modules, databases, or other similar elements. The communications environment 100 may include any number of these elements, devices, components, systems, and equipment in addition to other computing and communications devices not specifically described herein for purposes of simplicity.

Communications within the communications environment 100 may occur on or between any number of networks which may include wireless networks, data or packet networks, cable networks, satellite networks, private networks, publicly switched telephone networks (PSTN), a wired network, or other types of communication networks. For example, the different elements and components of the communications environment 100 may communicate using wireless communications, such as satellite connections, WiFi, WiMAX, CDMA, GSM, PCS, or hardwired connections, such as fiber optics, T1, cable, DSL, high speed trunks, and telephone lines.

The network 102 is an infrastructure for sending and receiving messages and signals according to one or more designated formats, standards, and protocols. The networks of the communications environment 100 may represent a single communication service provider or multiple communication service providers. The features, services, and processes of the illustrative embodiments may be implemented by one or more elements of the communications environment independently or as a networked implementation.

In one embodiment, the network 102 is a Metro Ethernet Network (MEN). Metro Ethernet is a computer network based on the Ethernet standard which covers a metropolitan area. Metro Ethernet may be used as a metropolitan access network to connect subscribers and businesses to a wider area network, such as the Internet. The wireless network 104 may support any number of wireless communications standards and protocols. The wireless network 104 may include any number of transmission towers, mobile switching centers, routers, servers, home location register, mobile location register, mobile devices, and other similar equipment not specifically shown, but known in the art.

In one embodiment, the network 102 may also support voice over Internet Protocol (VoIP) switches, video-on-demand servers, and wireless handset devices. Any number of connections, paths, links, or services may enable communication between the devices 108, 110, and 112, and wireless devices 114, 116, and 118 or with additional devices or parties not explicitly shown in FIG. 1.

The communications management system 106 is one or more devices utilized to enable, initiate, route, and manage communications between one, or more communications devices. The communications management system 106 may include one or more devices networked to manage the network 102. The communications management system 106 may include any number of servers, routers, switches, or advanced intelligent network devices. For example, the communications management system 106 may be a call controller. The communications management system 106 may manage wireless, wired, VoIP, data, and plain old telephone service (POTS) communications.

Individual devices within the communications environment 100 may include any number of components which may include processors, memory, logic, ports, boards, chipsets, interfaces, circuits, switches, and other computing and communications elements to implement the system and method herein described as hardware, software, or a combination thereof. The wireless device 118 illustrates various components or modules that may be utilized by the devices 108, 110, 112, wireless devices 114 and 116, or communications management system 106 to implement the illustrative embodiments. In one embodiment, the wireless device 118 or the device 110 may include a processor 120, a memory 122, state logic 124, an indicator 128, and a network interface 126. The wireless device 118 may include cell phones, PDAs, laptops, EVDO cards, wireless cards, and other smart wireless devices.

The processor 120 is circuitry or logic enabled to control execution of a set of instructions. The processor 120 may be one or more microprocessors, digital signal processors, central processing units, or other devices suitable for controlling an electronic device, including one or more hardware and software elements, executing software, instructions, programs, and applications, converting and processing signals and information, and performing other related tasks.

The processor 120 may be a single chip or integrated with other computing or communications elements.

The memory 122 is a hardware element, device, or recording media configured to store data for subsequent retrieval or access at a later time. The memory 122 may be static or dynamic memory. The memory 122 may include a hard disk, random access memory, cache, removable media drive, mass storage, or configuration suitable as storage for data, instructions, and information. In one embodiment, the memory 122 and processor 120 may be integrated. The memory 122 may use any type of volatile or non-volatile storage techniques and mediums. In one embodiment, the memory 122 may store the state information, data, and states that are determined and tracked as herein described.

The state logic 124 is logic, circuitry, a module, or instructions for tracking the state information for connections and devices. In one embodiment, the state logic 124 may give state information for the communications path between the wireless device 118 to the device 110. The state information may specify the condition of the communications path. The state logic 124 or performance logic may also be configured to measure and calculate performance averages and trends for communications paths in the communications environment 100.

The indicator 128 is a display for visually or audibly communicating the state information to a user. In one embodiment, the indicator 128 may be a touch screen or electronic display for displaying information to a user and receiving user input and selections. In another embodiment, the indicator 128 may be a graphical user interface (GUI) or application operable to display various details, information, data, indicators, icons, and other elements that indicate the state information. The indicator 128 may be displayed by any of the devices of the communications environment 100 and other devices that are not specifically shown, such as VoIP phones, video-on-demand servers, and other similar devices.

The network interface 126 is the interface adapter for communicating with a network. For example, the wireless device 118 may communicate with the wireless network 104 wirelessly through the network interface 126. The network interface 126 may allow the device 110 to communicate with the network 102 through a wired or wireless connection. In one embodiment, the state logic 124, indicator, and network interface 126 may be integrated in one or more chips, circuits, application specific integrated circuits (ASICs), field programmable gate arrays, or other elements. In one embodiment, end devices or users on either end of a communication may track the connection or system state.

Figure 2:
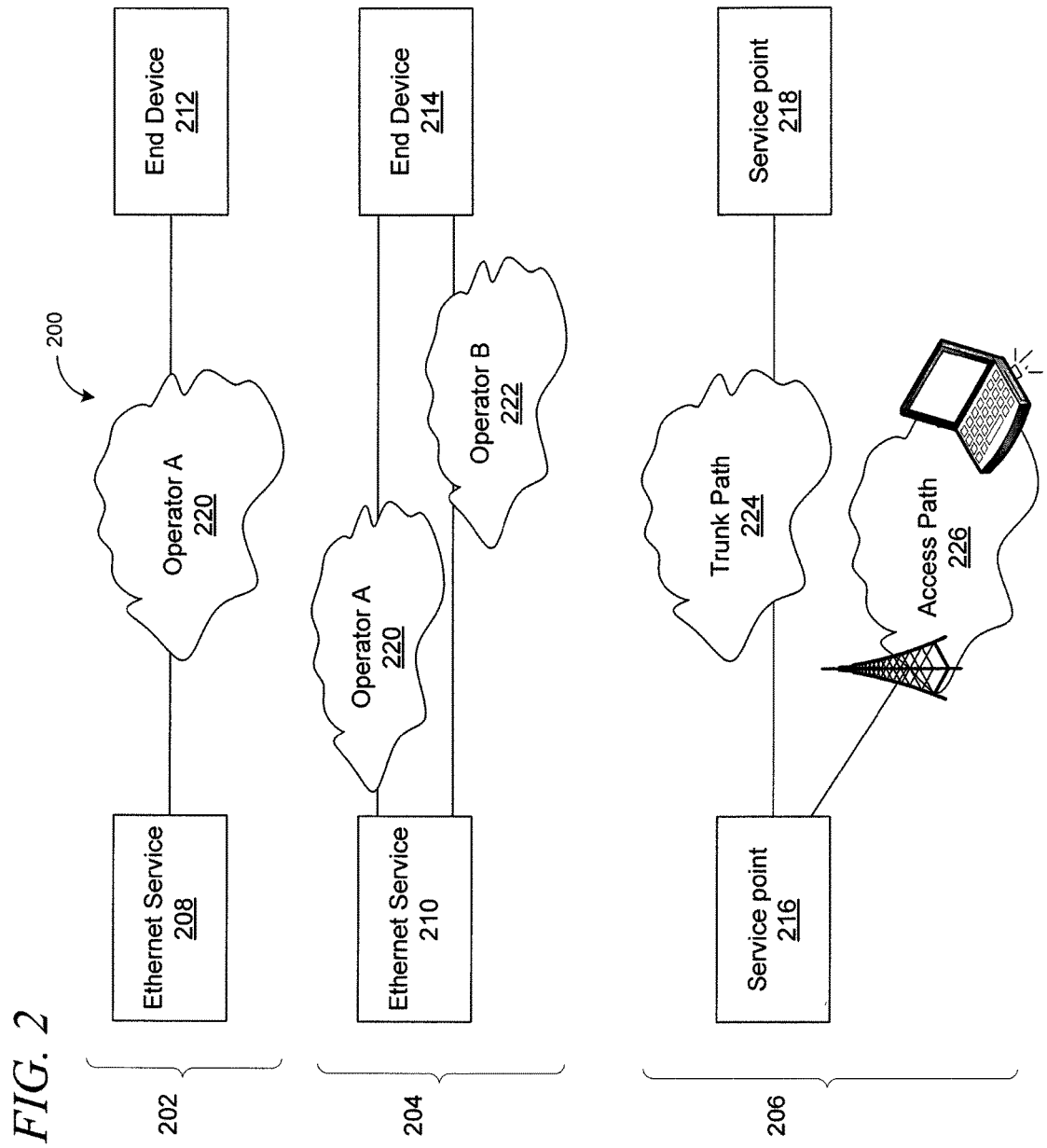
FIG. 2 is a pictorial representation of communications paths in accordance with an illustrative embodiment.

FIG. 2 is a pictorial representation of path states in accordance with an illustrative embodiment. In one embodiment, the path states may be utilized for working paths as well as back-up or protecting paths that may be utilized when a working path fails or is impaired or busy.

A communications system 200 is a particular implementation of elements and portions of the communications environment of FIG. 1. In one embodiment, the communication system 200 may include communications paths 202, 204, and 206, Ethernet services 208 and 210, end devices 212 and 214, service points 216 and 218, operator A 220, operator B 222, trunk path 224, and access path 226.

In one embodiment, the illustrative embodiments may provide state information for communications between points, devices, and services. In particular, the state information may provide information about the communications paths 202, 204, and 206 through operator A 220, operator B 222, trunk path 224 and access path 226. The state information may indicate availability, throughput, used and available capacity and a continuity check. The continuity check may indicate when no traffic is present.

The throughput performance measures may also contain trending statistics on the average, maximum, mean, mode, and change statistics. Performance measurement averages may be used to stabilize and smooth the typically impulse nature of packet loss and bursts that may occur on the communications path. Base statistics performance measures may include both long and short term average measurements.

Long duration measurements are typically call duration focused and may be coupled with location or network access point information to predict the amount of capacity that historically is available on that communications path. Short duration averages may be used as change indicators for the system and user to make decisions about the communication sessions both active and during setup. Short duration averages may be used with longer duration averages to determine the "rate of change" or first and or second order derivates of utilization. The call control system may use this "rate of change" to provide the customer or call control system with a failure prediction whereby the system or user may choose alternative actions to manage the communication system itself.

Figure 3:
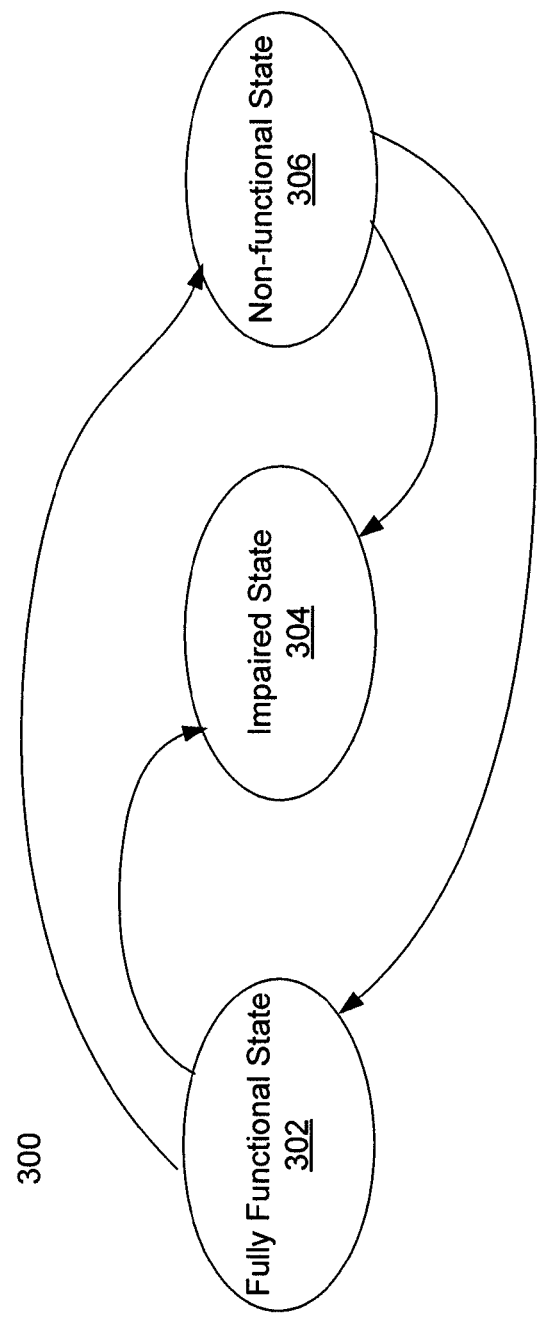
FIG. 3 is a pictorial representation of path states in accordance with an illustrative embodiment.

FIG. 3 is a pictorial representation of path states in accordance with an illustrative embodiment. The path or system states may include a fully functional state 302, an impaired state 304, and a non-functional state 306. The state of FIG. 2 may apply to primary, secondary, back-up, redundant, or emergency systems, paths, connections and/or devices. In particular, the path states may be applied to the communications environment 100 of FIG. 1 and the communications paths 202, 204, and 206 of FIG. 2. In one embodiment, the states 302, 304, and 306 may be implemented by hardware logic which may include transistors, logic gates, chipsets, circuits, field programmable gate arrays, or application specific integrated circuits. For example, a hardwired logical state machine may track the states 302, 304, and 306 to implement transitions as needed. In another embodiment, the states may be implemented by a logic engine, modules, or a state machine stored in memory for execution by a processor. For purposes of simplicity, the states are assumed to be operated by a system.

In one embodiment, a system may transition between the states 302, 304, and 306 at any time. The transitions may occur based on thresholds, parameters or criteria and each state 302, 304, and 306 may be associated with specific communications actions, diagnosis, messages, alarms, and indicators. In one embodiment, a moving average of goodput may be utilized to determine the state 302, 304, and 306 and associated actions. Any number of positive or negative performance measurements, criteria, thresholds, or characteristics may be utilized to monitor the system and determine the applicable state 302, 304, and 306 including throughput frame loss, delay, jitter and other similar factors.

As used herein, fully function does not mean fully functional in every aspect. In the fully functional state 302, the path or system or the expected capacity rate is fully functional. For example, even if there are some problems, such as loss, the effect is so minimal that it does not affect the service. Any jitter, loss, or delay that occurs is negligible or unnoticeable by the user and as a result the system is considered fully functional. The system may be utilized for data or voice communications, trunking, wireless signaling, FTP, pseudo wire, and any number of communications.

The impaired state 304 indicates that the path or system has not yet become non-functional, or is operating at capacity levels less than the full capacity rate. The impaired state 304 may indicate the path or system is running within or below identified thresholds, thereby indicating that the state is impaired, but also not fully-functionally. The impaired state 304 may allow the user or communications service provider to benefit from services, bandwidths, paths, or elements that might otherwise be categorized into the non-functional state 306 and shut down or disregarded. For example, instead of disregarding a wireless connection or fiber optic line that is experiencing problems, the wireless connection or fiber optic line may be utilized to the available capacity. In one embodiment, the system may determine the maximum available capacity in the impaired state 304. For example, the bandwidth levels may be increased from zero to a point that loss, distortion, or failures begin to significantly impact the connection or service. In the impaired state 304, the system may adjust the maximum available capacity utilizing testing or trial and error so that the system, connection, and resources may still be utilized even if the utilization is not at a maximum expected capacity.

Tracking the maximum, average, and mode goodput or available throughput as a collective "in threshold" set of performance attributes may be required in order for the application layer or call controller layer to choose the appropriate communication CODECS and a number of sessions for any path. The goodput or successful throughput utilization levels create the available, and failure thresholds on a floating basis in the impaired path state. It may be important to note that packet networks typically have over-subscription and congestion may normally occur in the packet path even when real-time services are being offered. The impaired state 304 may indicate when congestion occurs, as a result, the level of throughput capacity the path may support may be decreased. The long term and short term utilization and performance data create both utilization statistics, and failure thresholds. The thresholds provide rate of change indicators in order for the system, and/or subscriber to make session changes through performance feedback.

In another embodiment, the connection or system may begin at a maximum bandwidth and slowly decrease the bandwidth until the connection functions without significant loss. In another embodiment, the system may begin to operate at the maximum bandwidth level, record the amount of good throughput, and then alter the session to operate below or at the goodput throughput level. The parameters for classifying the system into one of the three states may be set by one or more communications service providers or by the user.

As a result, even if a wireless connection is only operating at 40 Mb instead of the 50 Mb guaranteed by a service level agreement (SLA), the connection may remain in place. In some existing systems, if the 50 Mb guarantee is not met, the connection is considered down and not used rather than utilizing the bandwidth, service, communications path, or system to the best available level of service and functionality available in the impaired state 304.

The non-functional state 306 may indicate that the system is unable to function properly or at a level acceptable for even impaired functionality. Non-functional may be a criteria or designation that indicates that the system or connection is so impaired that basic functionality is not available. For example, the system may still be capable of sending minimal data in the non-functional state 306. In another example, a device may crash or a connection may be severed resulting in the system entering the non-functional state 306. A minimum and maximum threshold may distinguish when the system is in the non-functional state 306 and the fully functional state 302, respectively. In one embodiment, the states may represent dynamic application service states for layers four and above of the OSI model.

In one embodiment, the system may provide or communicate with an interface that provides information regarding the average goodput and trends in the goodput. The goodput may be the actual bit rate throughput or may alternatively be the determined throughput after accounting for frame loss. The user interface may allow the user to reconfigure settings, parameters, or adjust environmental conditions within the users control to enhance goodput. The trend analysis and output may enable a user to forecast improvements or deterioration of the system. For example, a cell phone user may be able to move to a different location, disable features, or selectively disable bandwidth intensive applications based on input from a graphical user interface in order to improve communications in the impaired state 304. In another example, the user or applicable device may select to disable a high-definition feature and instead use a standard definition feature based on the goodput available in the impaired state 304. In one embodiment, the user interface may only be displayed when the system is in the impaired state 304 otherwise messages, such as "system functional" or "system failure" may indicate that the system is in state 302 or 306, respectively.

The interface and the state information may monitor details regarding long term averages, short-term averages, and trending (micro averages, movements, or movement indicators) for the users information. In one embodiment, the performance trending may be communicated to the user in order to make adjustments as needed. For example, the goodput average may be taken over the last hour and trends may be determined for the last ten seconds of communications. A signal indicator that is part of the user interface may provide the user details regarding improving or deteriorating communications signals. The trends and averages as determined may utilize fuzzy logic and sliding window analysis to make the various measurements and determinations as herein described. The fast average trend analysis may be utilized by the customer, communications service provider, and others to determine ramifications of changes in the system and micro analysis of ongoing communications. In one embodiment, the interface may display information or a state, such as that illustrated by FIG. 3.

In one embodiment, the system may transition from the impaired state 304 to the non-functional state 306 in response to determining that the capacity or bandwidth of the system has dropped below the capacity of the back-up or protection path or system. For example, if the system utilizes a 10 Mb connection, but is functioning in the impaired state 304 at 6 Mb, the system may not transition to a back-up path unless the connection drops below 4 Mb that is provided by the back-up path.

Figure 4:
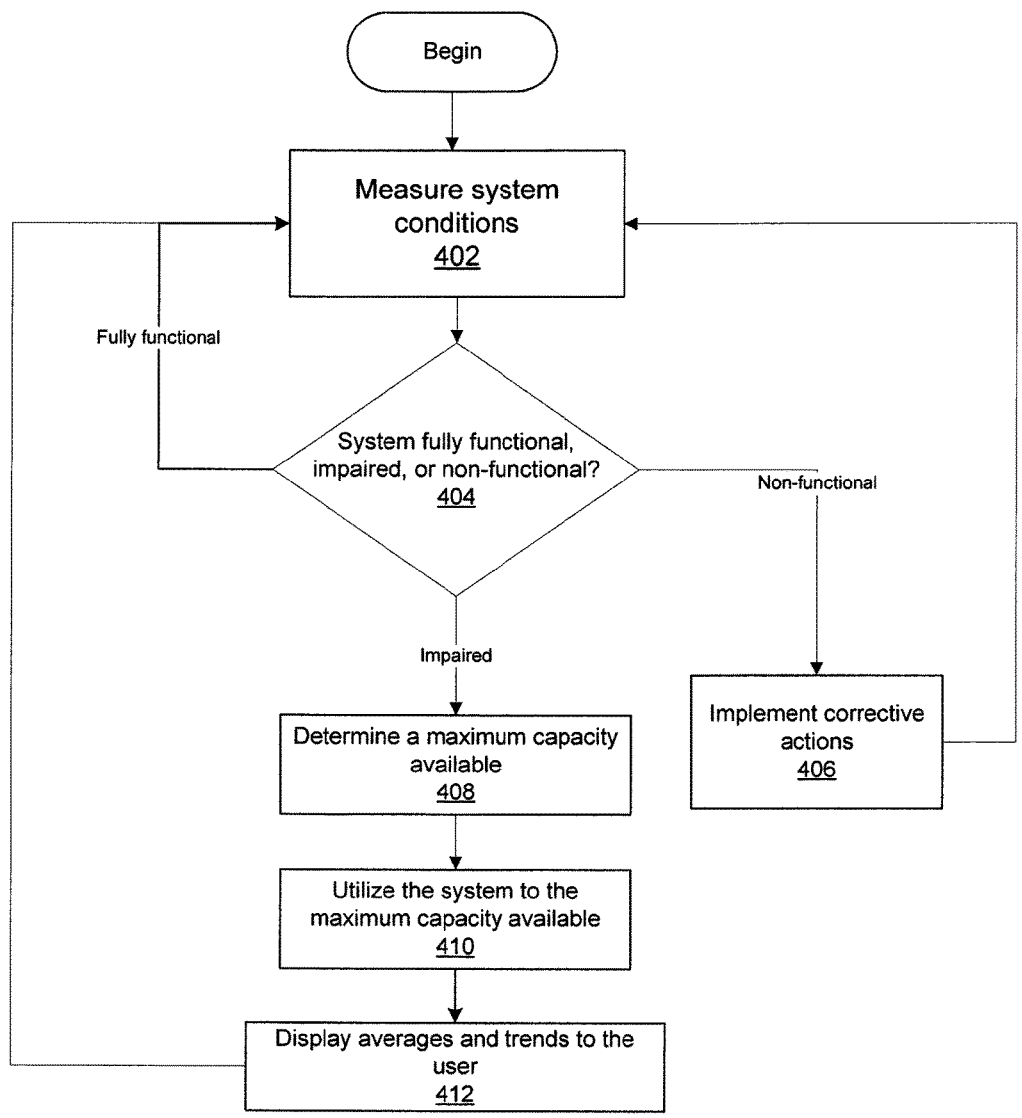
FIG. 4 is a flowchart of a process for utilizing path states in accordance with an illustrative embodiment.

FIG. 4 is a flowchart of a process for utilizing path states in accordance with an illustrative embodiment. The process of FIG. 4 may be implemented by any number of systems, devices, or equipment. The process may begin by measuring system conditions (step 402). In one embodiment, the system conditions may include an entire communications path from a device to an end-device or user. During step 402, the system may monitor a network connection or link, determine performance levels and thresholds, and otherwise evaluate and analyze system performance. In one embodiment, the system may include multiple connections and devices that may be measured simultaneously.

Next, the system determines whether the system is fully functional, impaired, or non-functional (step 404). The determination of step 404 may be made based on any number of thresholds, system characteristics, conditions, logic, or parameters. In one embodiment, the bandwidth for a connection may be set at 50 Mb/s. Bandwidth of between 0-5 Mb/s may indicate the system is non-functional. Bandwidth of greater than 40 Mb/s may indicate that the system is fully functional. As a result, bandwidth between 5 and 40 Mb/s may indicate the system is impaired.

The system may also utilize loss percentages or thresholds to determine a state of the system. For example, discards or other forms of loss between 10% and 90% indicate the system is in an impaired state, loss below 10% is considered fully functional, and loss greater than 90% is in a non-functional state. If the system is determined to be fully functional, the system returns to measure system conditions (step 402).

If the system is determined to be non-functional in step 404, the system implements corrective actions (step 406). The corrective actions may include initiating alarms, sending messages to one or more service providers, users, and network operators, and failing over to back-up systems, circuits, and paths. Next, the system returns again to step 402.

If the system is determined to be impaired in step 404, the system determines a maximum capacity available (step 408). The maximum capacity available may be determined in any number of ways. In one embodiment, the system may increase utilization of bandwidth to determine the maximum bandwidth that may be achieved for communications. In another embodiment, a self-test or maximum capacity test may be initiated and executed. The self-test may be implemented utilizing synthetic traffic or real-time communications and measurements of actual goodput.

Next, the system utilizes the system to the maximum capacity available (step 410). During step 410 the impaired system is utilized rather than disabling the system or burdening other communications resources. In some cases, the type of problem or issue plaguing the system may increase and decrease the maximum capacity available. In one embodiment, the system may be limited to the capacity determined in step 408 to prevent additional communications errors, problems, and failures. Rate shopping on other bandwidth limitations may be utilized to utilize the system/communications path to the maximum capacity. As a result, the determinations of FIG. 4 may be performed in a loop or repeatedly.

Next, the system displays averages and trends to the user (step 412). The averages and trends may indicate information and measurements performed during the process of FIG. 4. In one embodiment, the averages and trends may be displayed to the user in a graphical user interface. The user interface may also display suggestions based on historical information. For example, the historical information may indicate a best location within a home to improve voice communication based on past location information associated with performance data. In one embodiment, the wireless device may log or record performance and state information corresponding to various locations. The locations may be determined utilizing any number of methods which may include global position system (GPS) measurements, time delay measurements and location, and wireless triangulation. The historical information may be stored locally in the system or wireless device or may be stored at a remote location, such as a communications management system. The location and performance information may be utilized to suggest location or environmental changes that may be taken to increase the connection and system performance.

In one embodiment, multiple network devices may be configured to report state and performance information during daily routines. For example, a signal monitor integrated with a watch may allow various locations to be associated with state information in order to give future network users suggestions for improving a communications path. The location information may include an altitude, latitude, longitude, street address, or other location information that may be associated with the state information.

System impairments may happen much more frequently than most users or communications service providers admit. By utilizing the system when impaired, the overall capacity and functionality of the system may increase dramatically. Categorization and utilization of impaired systems is especially important if multiple portions of the system are impaired simultaneously. In another embodiment, an application available to a network operator may display the averages, trends, and state information to one or more users which may include service providers and customers.

In one embodiment, the process of FIG. 4 may be implemented for multiple communications paths simultaneously. For example, a cell phone may utilize multiple internal antennas or a single antenna to communicate with multiple communications towers. The state of each communications path may be determined in order to determine if or when a transition between communications streams should occur.

Figure 5:
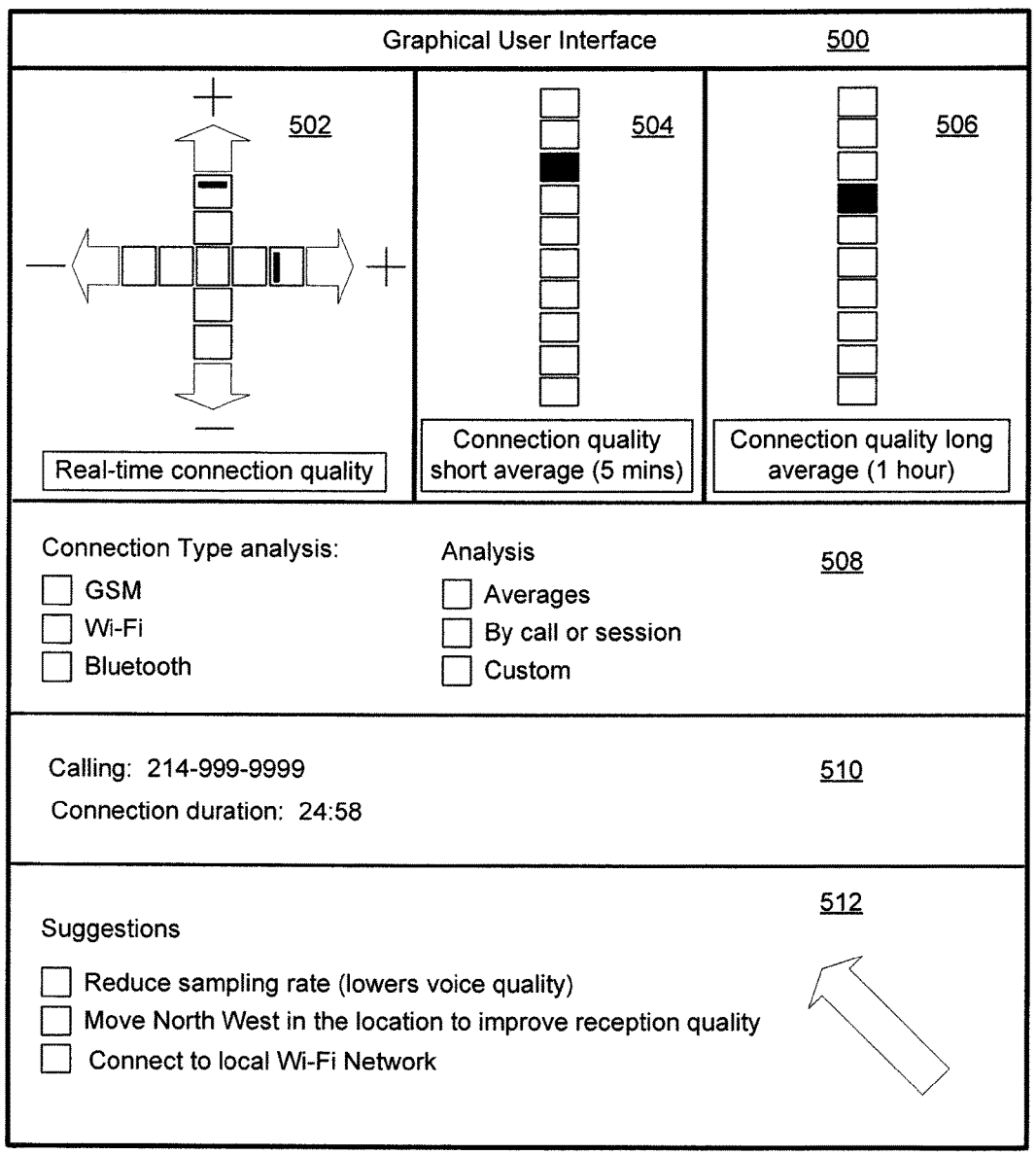
FIG. 5 is a graphical user interface in accordance with an illustrative embodiment.

FIG. 5 is a graphical user interface 500 in accordance with an illustrative embodiment. The graphical user interface 500 may include any number of graphical and interactive elements. In one embodiment, the graphical user interface 500 includes sections 502, 504, 506, 508, 510 and 512.

Section 502 includes various graphical elements for determining improvements or deterioration of communications. In one embodiment, the graphical user interface 502 may include an indicator that provides the real-time averages and trends for connection performance and quality. For example, the indicators may be sliding windows that show changes in signal strength and quality. The sliding window may help the user from preventing complete connection failures, such as dropped calls. The indicator may help a user determine how any number of positions, environmental conditions, and other conditions are affecting the signal quality and communications. In one embodiment, the indicators may be color coordinated. For example, an improving signal may be indicated by a + and an activated green box and a deteriorating signal may be indicated by a – and a red box.

In one embodiment, the trend may be a measurement of the overall communications path for a shorter amount of time. In another embodiment, average measurements utilized for an average indicator may be determined after 1000 measurements taken in sixty seconds. The trend measurements for a trend indicator may be 83 measurements taken in five seconds. For example, section 502 may include an indicator in which the horizontal elements (or x axis) represent the average measurements and the vertical elements (or y axis) may represent the trend measurements.

Section 504 may show a graphical user interface indicating the connection quality for a short average. For example, the short average may be five minutes. The indicator of section 504 may allow the user to evaluate connection quality in slightly larger time intervals than the trends and averages indicated in section 502. Similarly, section 506 may indicate the connection quality for a long average. For example, section 506 may indicate the connection quality for the last hour. In one embodiment, the time intervals or durations for sections 502, 504, and 506 may be set by a service provider. In another embodiment, the user may set the time intervals.

Section 508 may allow the user to specify information, graphics, details, and information displayed by the graphical user interface 500. In one embodiment, the user may select one or more connection types for analysis. For example, the phone of the user may be capable of GSM, Wi-Fi, and Bluetooth communications. In other embodiments, any number of connections, standards, and protocols may be selected for display or utilization based on the applicable device. The user may also specify the types of analysis displayed on the graphical user interface 500.

Section 510 may display standard communications information, such as ongoing calls, missed calls, call duration, unopened emails and text messages, and other similar details. Section 512 may display suggestions or potential remedies that may help improve the wireless connection or device performance. The suggestions may include any number of details or information. For example, section 512 may indicate applications that may be disabled, bandwidth levels that may be decreased, and alternative connections.

Figure 6:
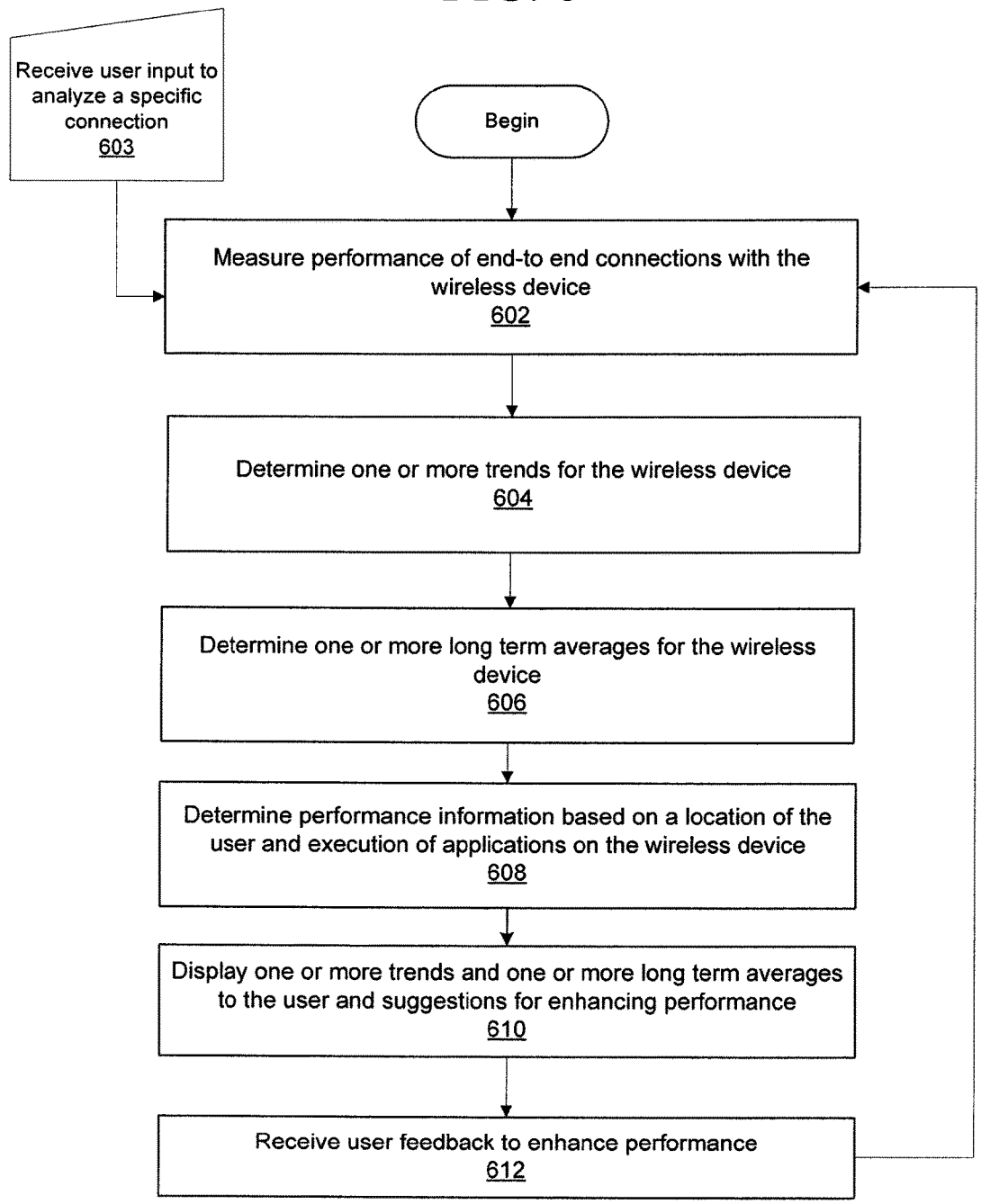
FIG. 6 is a flowchart of a process for providing a user performance information and suggestions for enhancing communications in accordance with an illustrative embodiment.

FIG. 6 is a flowchart of a process for providing a user performance information and suggestions for enhancing communications in accordance with an illustrative embodiment. In one embodiment, the process of FIG. 6 may be implemented by a wireless device. The wireless device may utilize hardware or software to implement the method processes and steps herein described. In one embodiment, communications logic interfaces with the transceiver, antenna, and other wireless communication elements of a device, such as a cell phone to perform various actions including display information to the user and provide real-time feedback for enhancing communications performance. In another embodiment, the process of FIG. 6 may be implemented utilizing instructions or coding that may be executed by a processor or loaded or installed into a field-programmable gate array or other similar programmable device. In yet another embodiment, the process of FIG. 6 may be implemented by an ASIC.

In an alternative embodiment, the wireless device may communicate performance information measurements, historical data or other details to a communications management system. The communications management system may perform additional measurements, statistical analysis and processing to generate the trends, averages, performance information, and suggestions that may be communicated to the user to enhance communications performance. In particular, the goodput and throughput measurements previously discussed may be utilized to provide user feedback for adjusting to the environment, conditions, and configuration of the communications device.

The process of FIG. 6 may begin by measuring performance of end-to-end connections with the wireless device (step 602). The connections may represent any number of communication methods, systems, hardware, standards, or protocols that may be utilized by the wireless device. For example, the wireless device may be configured to communicate with one or more other devices, systems, base station equipment or elements utilizing GSM, WiFi, Bluetooth, GRSM, or other wireless communications. During step 602 the goodput performance, throughput performance, signal strength, propagation delays, noise ratios, frame loss, errors and other similar performance information may be measured.

In one embodiment, a user may provide specific input to analyze one of the connections. The set-top box may receive user input to analyze a specific connection (step 603). The wireless device may receive user input to analyze a specific connection in response to a user noticing problems with a particular connection. For example, the WiFi connection may be dropping packets or experiencing unusual delays and as a result the user may provide a selection or user input to perform measurements for that specific connection and only that connection during step 602. The user may alternatively select to analyze the specific connection based on a future need for a stable connection. For example, the user may have an important phone call coming up and may want to analyze the GSM reception within a particular building in which the user has never been before placing the call to ensure the maximum call quality occurs during the communication. The user may elect to utilize a strong WiFi signal for calling in response to the GSM reception and commit to being sub-standard.

Next, the wireless device determines one or more trends for the wireless device (step 604). The trends may be provide instantaneous or real-time information regarding improving or deteriorating performance of the wireless device and associated connection. For example, dynamic bandwidth thresholds may be utilized in conjunction with fuzzy logic or other mathematical calculations to determine from multiple performance measurements that the signal quality for a PCS connection is deteriorating. Utilization of dynamic bandwidth thresholds based on frame size is further described in patent application Ser. No. 12/412,141 entitled System and Method for Dynamic Bandwidth Determinations filed Mar. 26, 2009, which is herein incorporated by reference.

Next, the wireless device determines one or more long-term averages for the wireless device (step 606). The one or more long-term averages may indicate performance measurements over an extended period of time. In one embodiment the extended period of time may be five minutes, half an hour, one hour, a day, a week or even a month. The long-term averages may provide context for the current state of the wireless device. For example, if a typical long-term average is a signal quality of eight but the current trend is a four the user or communications service provider may determine that any ongoing communications may be sub-standard or result in errors, dropped calls, or other performance problems. The sample size, time intervals or parameters utilized to determine step 604 and 606 may be set by default by the manufacturer of the wireless device. In another embodiment, a communications service provider providing service to the wireless device may set the parameters and information for determining the trends and averages. In another embodiment, the user may set the parameters for performing determinations of trends and averages based on past experience or in order to determine the most relevant information. During steps 602-606, measurements are made for the throughput, goodput performance, and utilization of the applicable device.

Next, the wireless device determines performance information based on a location of the user and execution of applications on the wireless device (step 608). The performance information may utilize the measurements determined in step 602. In addition, the performance information may retrieve historical information for the current location to determine typical performance levels for that area. The location may be determined utilizing wireless triangulation, GPS measurements, propagation delays or any number of other location determination methods known in the art. For example, one side of a building in which the user typically works may experience poor wireless service and connections while another side of the building may typically have strong and stable connections and offer better communication services. Similarly, the wireless device may encounter problems when multiple applications are running simultaneously on the wireless device.

In some cases, performance information and measurements may depend on the type and number of applications simultaneously being executed or ran on the wireless device. For example, call quality of voice communications may suffer when an instant messaging program is simultaneously being utilized. In another embodiment, e-mail applications and their corresponding sync features may be slowed significantly when a user is playing a network-based game through the wireless device.

Next, the wireless device displays the one or more trends and the one or more long-term averages to the user and suggestions for enhancing performance (step 610). The information and measurements displayed to the user may be determined based on steps 602 through 608. The suggestions may provide particular details based on the current performance information as well as historical performance information that may allow the user and wireless device to enhance performance. For example, the wireless device may provide a directional arrow and distance indicating an approximate location that may be utilized to increase signal quality for better voice communications without dropped calls or signal cutouts.

Similarly, the wireless device may suggest that an application be temporarily paused, terminated or discontinued to enhance one or more other ongoing communications. Step 610 may allow a user to reconfigure the wireless device to enhance communications. Similarly, step 610 may provide information that may allow a user to move locations, alter the environment around the wireless device, or otherwise take other steps that may enhance the communications of the wireless device. For example, by viewing the trends and averages the user may try opening and shutting blinds, moving locations, closing an instant messaging application, and taking other steps that may improve performance, but that the wireless device itself is incapable of performing.

Next, the wireless device receives user feedback to enhance performance (step 612). The user feedback may be movement of the user and wireless device to a separate location, termination of an application or other similar steps. In one embodiment, the user may enter text or make selections indicating why he or she thinks that the communications from a particular point, location or environment may be suffering. In one embodiment, the wireless device may provide a menu that allows a user to select environmental conditions currently experienced by the wireless device to determine what potential effect each environmental factor may have on the performance of the wireless device and the associated communications connections. The feedback may be utilized to determine environmental characteristics that most affect performance and utilize predictive logic based on the location and configuration of the wireless device to improve current and future performance. After receiving user feedback to enhance performance in step 612 the wireless device may return to measure performance of connections within the wireless device (step 602). The process of FIG. 6 may be repeated continuously in order to ensure that the interaction between the user and wireless device allows for enhanced communications to the extent allowable by the location, environment and configuration of the wireless device.

The previous detailed description is of a small number of embodiments for implementing the invention and is not intended to be limiting in scope. The following claims set forth a number of the embodiments of the invention disclosed with greater particularity.

What is claimed is:

1. A method for determining a state of a communications system, the method comprising:
receiving, with a computer, performance information about a plurality of segments of a communications path, the performance information being characterized by short-term and long-term averages and trends for each segment, wherein the trends include comparisons of performance information including historical performance information;
categorizing, with the computer, a state of each segment of a communications path as a fully functional state, an impaired state, or a nonfunctional state, based at least in part on the received performance information;
providing, with the computer, performance information about the plurality of segments of the communications path to an end user, through an end user device, wherein the performance information provided to the end user includes short-term and long-term averages and trends for each segment, wherein the performance information further includes location information indicating locations associated with the end user device where the performance of the end user device is optimized and application information identifying one or more applications affecting the performance of the end user device and recommending one or more applications to pause, terminate, or discontinue to enhance performance of the end user device, wherein recommendations identifying the one or more applications to pause, terminate, or discontinue to enhance performance of the end user device are displayed on the end user device; and
modifying, with the computer, operation of one or more devices in the communications path, based on categorization of the state of one or more segments of the communications path.

2. The method of claim 1, wherein the end user device is a wireless device.

3. The method of claim 2, wherein the wireless device records the provided performance information or state information corresponding to various locations.

4. The method of claim 1, wherein the communications path includes one or more communications systems.

5. The method of claim 1, wherein the communications path includes a plurality of segments operated by different communications service providers.

6. The method of claim 1, wherein the states are defined by a plurality of thresholds.

7. The method of claim 1, wherein a segment of the communications path is categorized as impaired in response to determining bandwidth available through the segment is greater than bandwidth for a backup connection and the segment is not fully functional.

8. The method of claim 1, further comprising determining a maximum capacity available to the communications path, wherein determining the maximum capacity available to the communication path comprises one or more operations selected from the group consisting of:
increasing bandwidth through one or more segments of the communication path from no bandwidth to a level of the maximum capacity available; and decreasing bandwidth through one or more segments of the communication path from an expected capacity available to the communication path when fully functional to the maximum capacity available.

9. The method of claim 1, wherein categorizing the state of each segment performed continuously for a time interval utilizing a plurality of thresholds for goodput through the segment.

10. The method of claim 9, wherein the goodput is calculated as delivered throughput after accounting for any frame loss.

11. A communications device comprising:
a network interface for communicating packets through a communications path; and
state logic in communication with the network interface, wherein the state logic:
receives performance information about a plurality of segments of a communications path, the performance information being characterized by short-term and long-term averages and trends for each wherein the trends include comparisons of performance information including historical performance information;
categorizes a state of each segment of a communications path as a fully functional state, an impaired state, or a nonfunctional state, based at least in part on the received performance information;
provides performance information about the plurality of segments of the communications path to an end user, through an end user device, wherein the performance information provided to the end user includes short-term and long-term averages and trends for each segment, wherein the performance information further includes location information indicating locations associated with the end user device where the performance of the end user device is optimized and application information identifying one or more applications affecting the performance of the end user device and recommending one or more applications to pause, terminate, or discontinue to enhance performance of the end user device, wherein recommendations identifying the one or more applications to pause, terminate, or discontinue to enhance performance of the end user device are displayed on the end user device; and
modifies operation of one or more devices in the communications path, based on categorization of the state of one or more segments of the communications path.

12. The communication device of claim 11, wherein the end user device is a wireless device.

13. The communication device of claim 12, wherein the wireless device records the provided performance information or state information corresponding to various locations.

14. The communication device of claim 11, wherein the communications path includes one or more communications systems.

15. The communication device of claim 11, wherein the communications path includes a plurality of segments operated by different communications service providers.

16. The communication device of claim 11, wherein the states are defined by a plurality of thresholds.

17. The communication device of claim 11, wherein a segment of the communications path is categorized as impaired in response to determining bandwidth available through the segment is greater than bandwidth for a backup connection and the segment is not fully functional.

18. The communication device of claim 11, wherein the state logic determines a maximum capacity available to the communication path by performing one or more operations selected from the group consisting of:
increasing bandwidth through one or more segments of the communication path from no bandwidth to a level of the maximum capacity available; and
decreasing bandwidth through one or more segments of the communication path from an expected capacity available to the communication path when fully functional to the maximum capacity available.

19. The communication device of claim 11, wherein the state logic categorizes the state of each segment performed continuously for a time interval utilizing a plurality of thresholds for goodput through the segment.

20. The communication device of claim 19, wherein the goodput is calculated as delivered throughput after accounting for any frame loss.

* * * * *